United States Patent
Spell et al.

(10) Patent No.: US 11,157,758 B2
(45) Date of Patent: Oct. 26, 2021

(54) SYSTEM AND METHOD TO RESTRICT DEVICE ACCESS IN VEHICLES

(71) Applicant: Aptiv Technologies Limited, St. Michael (BB)

(72) Inventors: David M. Spell, Kokomo, IN (US); Christopher D. Ruppel, Carmel, IN (US); Sunil Lingamurthy Javali, Kokomo, IN (US)

(73) Assignee: Aptiv Technologies Limited

( * ) Notice: Subject to any disclaimer, the term of this patent is extended or adjusted under 35 U.S.C. 154(b) by 2 days.

(21) Appl. No.: 16/806,044

(22) Filed: Mar. 2, 2020

(65) Prior Publication Data

US 2021/0271909 A1    Sep. 2, 2021

(51) Int. Cl.
| | |
|---|---|
| *G06K 9/00* | (2006.01) |
| *B60R 11/04* | (2006.01) |
| *H04W 48/04* | (2009.01) |
| *B60R 21/01* | (2006.01) |
| *G06K 7/14* | (2006.01) |
| *B60R 11/00* | (2006.01) |
| *B60K 35/00* | (2006.01) |
| *H04M 1/72463* | (2021.01) |

(52) U.S. Cl.
CPC .......... *G06K 9/00838* (2013.01); *B60K 35/00* (2013.01); *B60R 11/04* (2013.01); *B60R 21/01* (2013.01); *G06K 7/1417* (2013.01); *H04M 1/72463* (2021.01); *H04W 48/04* (2013.01); *B60K 2370/563* (2019.05); *B60K 2370/569* (2019.05); *B60R 2011/0003* (2013.01); *B60R 2300/8006* (2013.01)

(58) Field of Classification Search
CPC .. G06K 9/00838; G06K 7/1417; B60R 11/04; B60R 21/01; H04M 1/72577; H04W 48/04
See application file for complete search history.

(56) References Cited

U.S. PATENT DOCUMENTS

| | | |
|---|---|---|
| 7,474,264 B2 | 1/2009 | Bolduc et al. |
| 8,290,480 B2 | 10/2012 | Abramson et al. |
| | (Continued) | |

FOREIGN PATENT DOCUMENTS

WO    2018212804 A1    11/2018

OTHER PUBLICATIONS

Deicke, F., Fisher, W. J., & Faulwaßer, M. (Jul. 2012). Optical wireless communication to eco-system. In 2012 Future Network & Mobile Summit (FutureNetw) (pp. 1-8). IEEE. (Year: 2012).*

(Continued)

*Primary Examiner* — Michael Robert Cammarata
(74) *Attorney, Agent, or Firm* — Billion & Armitage

(57) ABSTRACT

A vehicle safety system includes at least one detector positioned to monitor at least a portion of an interior of a vehicle and a processor/communication system configured to receive inputs from the at least one detector and to communicate with brought-in devices located within the vehicle. The processor/communication system determines a location of the brought-in device based on visible/IR signals generated by the brought-in device and detected by the at least one detector, wherein the processor/communication system communicates restrictions/permissions to the brought-in device based on the determined location.

23 Claims, 3 Drawing Sheets

(56) References Cited

U.S. PATENT DOCUMENTS

| | | |
|---|---|---|
| 8,478,482 B2 | 7/2013 | Tan |
| 8,519,836 B2 | 8/2013 | Grossman |
| 8,718,536 B2 | 5/2014 | Hannon |
| 8,818,725 B2 | 8/2014 | Ricci |
| 9,224,289 B2 | 12/2015 | Demeniuk et al. |
| 9,270,809 B2 | 2/2016 | Allen et al. |
| 9,338,605 B2 | 5/2016 | Guba et al. |
| 9,358,940 B2 | 6/2016 | Cooper et al. |
| 9,369,196 B2 | 6/2016 | Hannon |
| 9,379,805 B2 | 6/2016 | Hannon |
| 9,386,447 B2 | 7/2016 | Tibbitts et al. |
| 9,681,468 B2 | 6/2017 | Lee et al. |
| 9,769,297 B2 | 9/2017 | Miller et al. |
| 9,854,433 B2 | 11/2017 | Hannon |
| 9,888,080 B2 | 2/2018 | Miao |
| 9,912,802 B2 | 3/2018 | Wolterman |
| 9,949,098 B2 | 4/2018 | Archer et al. |
| 10,063,687 B2 | 8/2018 | Allen et al. |
| 10,178,552 B2 * | 1/2019 | Yeom .............. H04L 63/18 |
| 10,205,819 B2 | 2/2019 | Hannon et al. |
| 10,219,116 B2 | 2/2019 | Lundsgaard et al. |
| 10,219,125 B2 | 2/2019 | Archer et al. |
| 10,271,265 B2 | 4/2019 | Breaux, III et al. |
| 10,397,396 B2 | 8/2019 | Allen et al. |
| 2006/0284769 A1 * | 12/2006 | Bolduc ............... G01S 5/02 342/463 |
| 2008/0129684 A1 | 6/2008 | Adams et al. |
| 2011/0295458 A1 | 12/2011 | Halsey-Fenderson |
| 2011/0301780 A1 | 12/2011 | Miller et al. |
| 2012/0214463 A1 * | 8/2012 | Smith ............. H04M 1/72577 455/418 |
| 2014/0163774 A1 | 6/2014 | Demeniuk |
| 2014/0179351 A1 | 6/2014 | Hannon |
| 2014/0179356 A1 | 6/2014 | Hannon |
| 2014/0274018 A1 * | 9/2014 | Miller ................ H04W 4/50 455/418 |
| 2014/0335902 A1 | 11/2014 | Guba et al. |
| 2015/0147067 A1 * | 5/2015 | Ryan ................. H04W 4/02 398/118 |
| 2015/0276399 A1 * | 10/2015 | Breuer ................ H04J 3/10 356/4.03 |
| 2015/0319608 A1 * | 11/2015 | Varughese ........ H04M 1/72577 455/456.4 |
| 2015/0348146 A1 * | 12/2015 | Shanmugam ...... G06Q 20/3829 705/71 |
| 2016/0119467 A1 | 4/2016 | Allen et al. |
| 2016/0266235 A1 * | 9/2016 | Hannon ........... H04M 1/72572 |
| 2016/0269893 A1 | 9/2016 | Hannon |
| 2017/0019525 A1 * | 1/2017 | Hannon ................ G01S 5/18 |
| 2017/0126881 A1 | 5/2017 | Allen et al. |
| 2017/0186290 A1 * | 6/2017 | Li .................... G08B 13/19645 |
| 2018/0124234 A1 * | 5/2018 | Covington, Jr. ........ H04L 67/12 |
| 2018/0338034 A1 | 11/2018 | Allen et al. |
| 2019/0052747 A1 * | 2/2019 | Breaux ................ G06K 9/0053 |
| 2019/0068776 A1 * | 2/2019 | Dyne ................. H04W 4/021 |
| 2019/0141607 A1 | 5/2019 | Tibbitts et al. |
| 2019/0166474 A1 | 5/2019 | Lundsgaard et al. |
| 2019/0199850 A1 | 6/2019 | Hannon et al. |
| 2020/0288009 A1 * | 9/2020 | Hennessy ......... H04M 1/72577 |
| 2020/0349666 A1 * | 11/2020 | Hodge ................ G06F 21/36 |

OTHER PUBLICATIONS

J. M. McCune, A. Perrig and M. K. Reiter, "Seeing-is-believing: using camera phones for human-verifiable authentication," 2005 IEEE Symposium on Security and Privacy (S&P'05), Oakland, CA, USA, 2005, pp. 110-124, doi: 10.1109/SP.2005.19. (Year: 2005).*

U.S. Appl. No. 16/275,374 Positioning System and Method, filed Feb. 14, 2019, Oman et al.

U.S. Appl. No. 16/452,594 Detection Device, filed Jun. 26, 2019, Oman et al.

* cited by examiner

SYSTEM AND METHOD TO RESTRICT DEVICE ACCESS IN VEHICLES

FIELD

This disclosure is generally directed to connectivity between personal devices and vehicular systems and more specifically to detecting the location of personal devices and controlling privileges based on the detected location of the device.

BACKGROUND

In an effort to reduce and prevent distracted driving, many vehicles provide systems and methods for restricting or preventing the operator of a vehicle from using devices brought into the vehicle (hereinafter, "brought-in devices"), such as smartphones, tablets, and other personal devices. For example, a brought-in device paired with the vehicle via. Bluetooth may have at least some of its functions limited to prevent the operator of the vehicle from using the brought-in device during vehicle operation. In some cases, functionality of the brought-in device may be restored if the owner of the brought-in device indicates or acknowledges that they are not operating the vehicle. An obvious fault in this type of system is that it relies on the integrity of the user for input regarding whether the user is the operator (i.e., driver) of the vehicle or a passenger.

SUMMARY

According to one aspect, a vehicle safety system includes at least one detector positioned to monitor at least a portion of an interior of a vehicle and a processor/communication system configured to receive inputs from the at least one detector and to communicate with brought-in devices located within the vehicle. The processor/communication system determines a location of the brought-in device based on visible/IR signals generated by the brought-in device and detected by the at least one detector, wherein the processor/communication system communicates restrictions/permissions to the brought-in device based on the determined location.

According to another aspect, a method of restricting device privileges within a vehicle includes requesting visible/infrared (IR) verification from one or more brought-in devices. The method further includes detecting visible/IR signals generated by the one or more brought-in devices and determining a location of each of the one or more brought-in devices based on the detected visible/IR signals. Restrictions/permission are generated based on the determined location of each of the one or more brought-in device and the restrictions/permissions are communicated to the one or more brought-in devices.

DETAILED DESCRIPTION

According to some aspects a vehicle safety system is provided that relies on visible/infrared (IR) light generated by brought-in devices to determine the location of the one or more devices within a vehicle. Based on the determined location of each of the one or more brought-in devices, restrictions/permissions are generated and communicated to each of the brought-in devices. In some embodiments, additional feedback is received from one or more external sensors and/or from the brought-in devices themselves that is utilized by the vehicle safety system to determine the location of the brought-in device within the vehicle.

Figure 1:
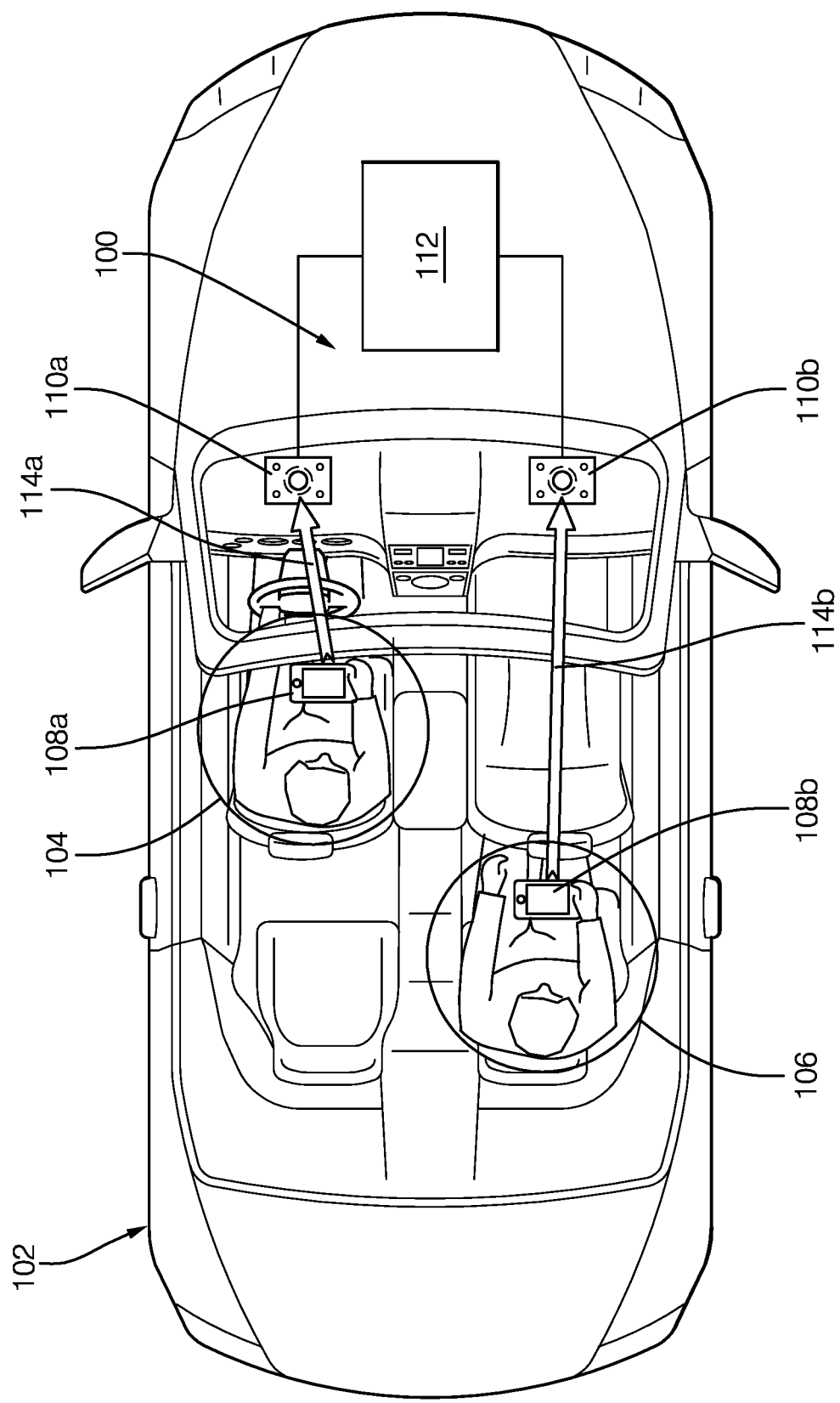
FIG. 1 is a top view of a vehicle that includes a vehicle safety system according to some embodiments.

FIG. 1 is a top view of a vehicle that includes a vehicle safety system 100 installed within a vehicle 102 according to some embodiments. In some embodiments, the vehicle 102 includes a driver area 104 and one or more passenger areas 106. In general, vehicle safety system 100 operates to restrict access to brought-in devices 108a (including but not limited to smartphones, cell phones, tablets, etc.) located in the driver area 104 and to permit access to brought-in devices 108b located in the passenger areas 106.

In some embodiments, vehicle safety system 100 includes one or more detectors 110a, 110b and a processor/communication system 112. The one or more detectors 110a, 110b are configured to monitor activity within the cabin of the vehicle and may be positioned accordingly. For example, in some embodiments the detectors 110a, 110b are positioned on the dashboard of the vehicle 100 and directed rearward to monitor passengers in the driver area 104 and one or more passenger areas 106. In some embodiments, one or more of the detectors 110a, 110b are positioned on the ceiling of the cabin area and are directed downward toward the plurality of passengers. In some embodiments the one or more detectors 110a, 110b are positioned to include a field of view (FOV) that corresponds with a particular seating area (e.g., driver area 104, passenger area 106) and may be mounted in locations corresponding to the desired FOV. In other embodiments the one or more detectors 110a, 110b are positioned to include a FOV that corresponds with a greater portion of the cabin (e.g., both driver area 104 and passenger area 106).

In some embodiments, detectors 110a, 110b are cameras capable of capturing one or more images and/or visible light signals. In some embodiments, detectors 110a, 110b are infrared (IR) detectors operating capable of detecting IR images and/or IR signals. In some embodiments, detectors 110a, 110b include both a camera capable of detecting images and/or visible light signals and an IR detector capable of detected IR images and/or IR signals. In addition, in some embodiments it is beneficial to utilize equipment such as cameras, IR detectors, etc., utilized for other functions within the vehicle, such as driver alertness monitoring. For the purposes of this description, the information captured by detectors 110a, 110b is described as visible/IR signals corresponding with the visible and IR portions of the electromagnetic spectrum. However, it should be understood that visible/IR signals include images captured by a camera, IR images captured by an IR detector, as well as specific visible light signals and IR signals generated by the brought-in device 108a, 108b. For example, a number of brought-in devices generate IR light signals in the form of IR illumination and IR dot projection. Detectors 110a, 110b may be utilized to detect IR light generated by these devices.

Processor/communication system 112 utilizes visible/IR signals to determine the location of the brought-in devices 108a, 108b within the cabin of the vehicle. Analysis by processor/communication system 112 may include image analysis of captured images, image analysis of IR images, analysis/detection of encoded visible signals, and/or analysis/detection of encoded IR signals. Based on the determined location of the brought-in devices 108a, 108b, processor/communication system 112 updates restrictions/privileges associated with each device and communicates the restrictions/privileges to each brought-in device 108a, 108b. For example, in the embodiment shown in FIG. 1 the brought-in device 108a is determined to be located in the driver area 104. In response, processor/communication system 112 communicates restrictions to device 108a restricting functionality of the device. The restrictions may include implementation of a one or more actions, such as preventing the lock screen from being opened, disabling messaging, disabling alerts generated at the device, etc. In some embodiments, the determination that the brought-in device 108a is located in the driver area 104 may also result in other actions, such as pairing and/or assigning hands-free functionality (e.g., voice-activated instructions, safe display/automated voice reading of received messages, etc.) to the device. For example, in an embodiment in which two brought-in devices 108a and 108b are located in a vehicle, a determination that brought-in device 108a is located in the driver area 104 may result in assigning hand-free capabilities to that device only. For those brought-in devices (e.g., 108b) determined not to be located in the driver area 104 (i.e., located in a passenger area 106), permissions are communicated allowing full access to the device. In some embodiments, the default state for a new device brought into a vehicle is a restricted state. That is, permissions must be actively communicated to a brought-in device 108a, 108b to allow the brought-in device to operate within the vehicle 102. In other embodiments, the default state is permissive, and restrictions are provided only in response to a determination that the brought-in device 108a, 108b is located in the driver area 104.

Figure 2:
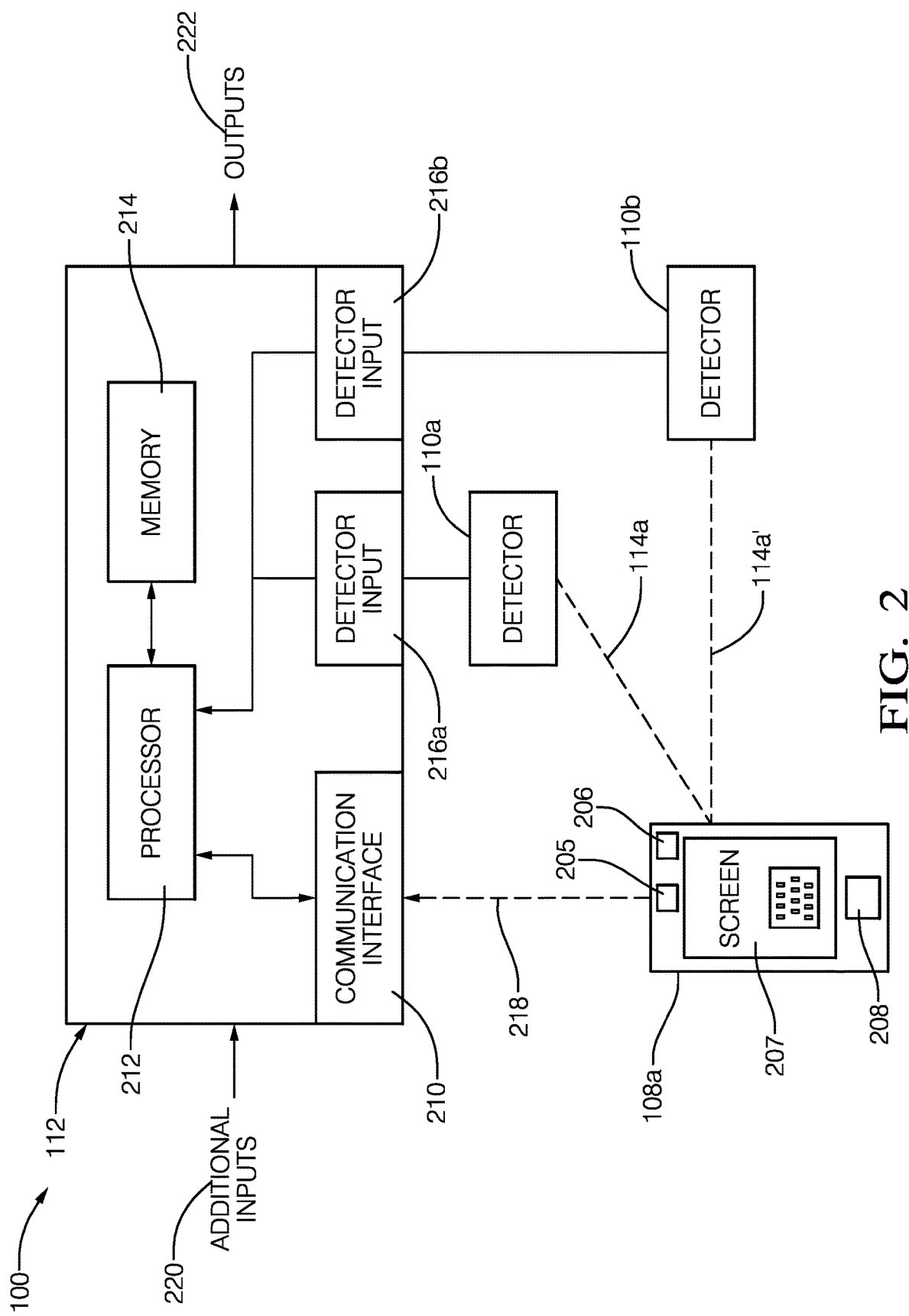
FIG. 2 is a block diagram of a vehicle safety system interacting with a brought-in device according to some embodiments.

With reference to FIG. 2, additional detail is provided regarding communication between the vehicle safety system 100 and the one or more brought-in devices 108a. Detectors 110a, 110b are configured to receive visible/IR signals 114a, 114a'. Processor/communication system 112 includes communication interface 210, processor 212, memory 214, and visible/IR inputs 216a, 216b.

In the embodiment shown in FIG. 2, brought-in device 108a includes one or more of an infrared (IR) generator 205, an LED/flash 206, a screen/display 207, and one or more secondary sensors 208. In some embodiments, the visible/IR signal 114a is an IR signal generated by IR generator 205. In some embodiments, the visible/IR signal 114a is a visible light signal generated by the LED/flash 206. In some embodiments, the visible/IR signal 114a is a visible light signal generated by the screen/display 207. In some embodiments, the visible light/IR detector 110a, 110b is a camera and the visible/IR signal 114a is an image captured by the camera. That is, in some embodiments the visible/IR signal 114a includes passive images captured by the camera in addition to active visible/IR signals generated by the brought-in device 108a. As described in more detail below, information included in passive images may include position of a user/operator relative to the brought-in device 108a. For example, analysis of the passive image may indicate a user/operator extending the brought-in device 108a into a passenger area 106 in an attempt to trick the vehicle safety system 100. As described in more detail below, in some embodiments the visible/IR signal 114a is encoded with information. In some embodiments, screen/display 207 may be capable of generating an encoded visible light signal in the form of a barcode displayed on the screen/display 207. In other embodiments, both IR generator 205 and/or LED/flash 206 may also be utilized to generate an encoded visible/IR signal 114a. In addition, in some embodiments a brought-in device 108a includes one or more of IR generator 205, LED/flash 206, and screen/display 207, and may generate visible/IR signals utilizing one or more of these components.

In some embodiments, brought-in device 108a additionally includes one or more secondary sensors 208 (e.g., accelerometers, inertial measurement units (IMU)) capable of measuring changes in the location of the brought-in device 108. As discussed in more detail below, in some embodiments the secondary sensors 208 are utilized to detect a change in location of the brought-in device 108a—for example from a passenger area 106 to the driver area 104. In some embodiments, this information can be utilized to modify restrictions/permissions associated with each brought-in device 108a. In particular, this is beneficial if the location of the one or more brought-in devices 108a changes during operation of the vehicle or in response to a user attempting to trick the system by positioning the brought-in device 108a in a passenger area 106 during initialization using visible/IR signals and then subsequently moving to the driver area 104.

In some embodiments, brought-in device 108a includes a processor and memory (not shown). In some embodiments, an application or app is downloaded to the memory and executed by the processor to implement one or more functions. For example, the application implemented by the brought-in device 108a may be configured to communicate with the processor/communication system 112, and to implement instructions received from the processor/communication system 112 such as generating a visible/IR signal and implementing restrictions/permissions received from the processor/communication system 112. In some embodiments, this may also include tracking changes in location of the device based on measurements made by the secondary sensors 208.

In some embodiments, processor/communication system 112 includes communication interface 210 configured to communicate with the one or more brought-in devices 108a via communication channel 218. In some embodiments, communication channel 218 utilizes one or more radio frequency (RF) communication protocols (e.g., Bluetooth, Ultra-wideband (UWB), Wi-Fi, etc.). In some embodiments, communication between processor/communication system 112 is uni-directional, wherein communication interface 210 communicates requests to generate visible/IR signals and further communicates restrictions/permissions. In some embodiments, processor/communication system 112 may also communicate a time-stamped determined location to the brought-in device 108a following a determination of location using the visible light/IR detection. The location history may be utilized by the brought-in device 108a in combination with one or more secondary sensors 208 to detect movement of the brought-in device 108a from one area to another (e.g., from the passenger area 106 to the driver area 104 or vice versa). In this embodiment, a change in location from a passenger area 106 to the driver area 104 may result in the brought-in device 108a internally changing permissions/restrictions without receiving feedback from the processor/communication system 112, or may result in the brought-in device 108a initiating visible light/IR communication to alert the vehicle safety system 100 of the new location of the brought-in device 108a. In some embodiments, communication 218 between the processor/communication system 112 and the brought-in device 108a is bi-directional, wherein processor/communication system 112 is capable of receiving feedback from each brought-in device 108*a*. For example, changes in location detected by each brought-in device 108*a* may be communicated to the processor/communication system 112. In response, restrictions/privileges may be modified and communicated to the brought-in device 108*a* and/or a request may be generated for the device to generate a visible/IR signal so that the location of the brought-in device 108*b* may be determined and/or verified.

As discussed above, light/IR detectors 110*a*, 110*b* are configured to detect visible light and/or infrared signals. In some embodiments, the detectors 110*a*, 110*b* are cameras capable of capturing of one or more images. In some embodiments, the screen and/or light-emitting diode (LED) located on the brought-in device 108*a* can be utilized to generate a visible light signal detectable by the light/IR detectors 110*a*, 110*b*. Likewise, brought-in devices 108*a* may include an IR device utilized for functions such as facial recognition, but which can also be utilized to generate IR signals detectable by the light/IR detectors 110*a*, 110*b*. In some embodiments, light/IR detectors 110*a*, 110*b* are capable of detecting only visible light. In some embodiments, light/IR detectors 110*a*, 110*b* are capable of detecting only IR signals. In other embodiments, light/IR detectors 110*a*, 110*ba* are capable of detecting both visible light and IR signals. Light/IR detectors 110*a*, 110*b* communicate detected visible/IR signals to detector inputs 216*a*, 216*b* of processor/communication interface 112, which is in communication with processor 212.

In some embodiments, processor 212 is in communication with communication interface 210, detector inputs 216*a*, 216*b* and memory 214. In some embodiments, memory 214 stores instructions executed by processor 212 to implement functions/steps regarding generating restrictions/permissions based on the detected location of the one or more brought-in devices 108*a*, 108*b*. In some embodiments, a combination of hardware and software is utilized to implement the functions/steps described herein. As discussed in more detail below, functions implemented by processor 212 are utilized to determine the location of a particular brought-in device 108*a* based on the visible/IR signals detected by the detectors 110*a*, 110*b*. In some embodiments, functions implemented by processor 212 include image analysis provided with respect to one or more images captured by light/IR detectors 110*a*, 110*b* (e.g., cameras), which may include analysis of passive aspects within the field of view of the camera as well as analysis of visible/IR signals generated by the brought-in device 108*a* (e.g., barcodes generated on display 207). Based on the determined location of the brought-in device 108*a*, processor 212 determines restrictions/permissions to be assigned to the brought-in device 108*a* (as well as other brought-in devices).

In some embodiments, at start-up (i.e., starting of the vehicle) an initialization process is implemented to determine the locations of each brought-in device 108*a* (as well as brought-in device 108*b* shown in FIG. 1) within the vehicle and to determine restrictions/permissions with respect to each brought-in device 108*a*. The initialization process includes communicating a request to each of the plurality of brought-in devices 108*a*, 108*b* for the devices to generate a visible/IR signal. In some embodiments, the request is generated by the processor/communication system 112 and communicated to the one or more brought-in devices 108*a*, 108*b* via communication channel 218. In some embodiments the request is provided to the brought-in device 108*a*, 108*b* without notification of the user, wherein the visible/IR signal is generated without user interaction (i.e., passive mode). In some embodiments the request may be communicated to the user (e.g., displayed via the brought-in device 108*a*, 108*b*), and may request some action on behalf of the user (e.g., hold up the brought-in device 108*a*, 108*b* facing the detectors 110*a*, 110*b* (i.e., active mode). In some embodiments, the request may be communicated to the user via an external system such as audible speakers located within the vehicle and/or infotainment displays. For example, upon entering the vehicle audible and/or visual messages may be communicated to the users and passengers instructing them to hold up or display brought-in devices 108*a*, 108*b* for visible light/IR verification. In some embodiments, whether user interaction is required may depend on the type of locating method utilized in subsequent steps and on whether other methods of locating the brought-in device 108 are utilized in conjunction with the detectors 110*a*, 110*b*.

In addition, the request and subsequent generation of visible/IR signals may be performed simultaneously by each of the plurality of brought-in devices 108*a*, 108*b* or one at a time. For example, in some embodiments the request is provided to each of the brought-in devices (i.e., devices 108*a*, 108*b* shown in FIG. 1) at the same time and each brought-in device 108*a*, 108*b* generates a visible/IR signal at approximately the same time. In this embodiment, encoding of the visible/IR signal is utilized to differentiate between the plurality of visible/IR signals received at each of the detectors 110*a*, 110*b* to determine which brought-in device 108*a*, 108*b* is located at which location. For example, in one embodiment the screen 207 of the brought-in device 108*a* is utilized to generate a unique visible light signal 114*a*, 114*a*'. This may include displaying a bar code or similar unique identifier that can be identified by processor/communication system 112 using image analysis techniques.

In other embodiments, the request generated by processor/communication system 112 is communicated to each of the plurality of brought-in devices 108*a*, 108*b* one at a time so that only one brought-in device is communicating a visible/IR signal at a time. In this embodiment, because only a single brought-in device (e.g., brought-in device 108*a*) is communicating at a given instant, and the device communicating is known to the processor/communication system 112, the visible/IR signal does not require encoding.

Based on the visible/IR signal detected by the one or more detectors 110*a*, 110*b*, processor/communication system 112 determines the location of the one or more devices that generated the visible/IR signal. A number of methods may be utilized to determine location of a brought-in device 108*a*, 108*b* based on a visible/IR signal. For example, in some embodiments the field of view of each visible light/IR detector 110*a*, 110*b* is configured to receive light only from a specified area (e.g., driver area 104, specified passenger area 106), wherein visible light/IR detected by a particular detector indicates the presence of a brought-in device in the corresponding area. For example, visible light/IR detector 110*a* may be located to monitor the driver area 104 (e.g., has a field of view corresponding with the driver area 104). A visible/IR signal detected by detector 110*a* indicates that the brought-in device 108*a* is located in the driver area 104. In some embodiments, image analysis software may be utilized to analyze images captured with respect to the field of view of the detectors 110*a*, 110*b* (e.g., camera, IR camera), wherein image analysis includes parsing the received visible/IR images to determine the location of the brought-in devices 108*a*, 108*b* within the vehicle. In some embodiments, image analysis includes not only analysis of visible/IR signals generated by the brought-in device 108*a*, 108*b* (e.g., barcodes generated by display 207, IR signals generated by IR generator 205, visible signals generated by LED/flash 206), but also analysis of passive components such as occupant position relative to the brought-in device 108a, 108b. This may include facial recognition analysis, occupant detection analysis, etc., providing information regarding the location of the occupants within the vehicle as well as relative to the brought-in device 108a, 108b. In other embodiments, time-of-flight (TOF) methods may be utilized to determine the location of the brought-in devices 108a, 108b. For example, in some embodiments visible/IR signals generated by each brought-in device may be encoded with phase information that allows detectors 110a, 110b to determine the distance from each detector 110a, 110b to the brought-in device. The distance information is then utilized to triangulate a location of the respective brought-in device. In other embodiments, each brought-in device 108a, 108b generates a coded visible/IR signal, wherein passive TOF may be utilized to determine the location of the brought-in device 108a, 108b.

In some embodiments, in addition to visible/IR signals detected by the one or more detectors 110a, 110b, processor/communication system 112 receives additional inputs 220 from one or more external sensors. In some embodiments, processor/communication system 112 utilizes the additional inputs 220 to verify and/or corroborate the location of the device determined based on detected visible/IR signals. These additional inputs 220 may provide feedback with respect to the locations or changes-of-locations of detected occupants and/or the location of brought-in devices. For example, in one embodiment the additional input 220 is provided by an occupant sensor (e.g., pressure sensor located within each seat, seat belt buckled/unbuckled sensors, etc.) capable of detecting the presence of an occupant. This information may be utilized to corroborate that detection of a brought-in device 108a coincides with a detected passenger. In the event that the detected location of the brought-in device 108a (as detected by the visible/IR signal communicated from the device) does not correspond with a detected passenger, this may be an indication that a user is holding the device in a passenger area in order to fool the system into granting full permissions. In response to the input received from the occupant sensor, the processor/communication system 112 may communicate restrictions to the brought-in device 108a preventing access to at least some functions. In some embodiments, processor/communication system 112 may request additional visible/IR signals be collected from the brought-in device 108a. In other embodiments, other types of external sensors may be utilized to provide feedback to the processor/communication system 112. In some embodiments, the additional input 220 includes feedback from external sensors regarding the location of the brought-in device 108a. For example, in some embodiments one or more Bluetooth sensors, ultra-wide band (UWB) sensors, and/or Wi-Fi sensors may be utilized to estimate a location of brought-in devices. In some embodiments, location estimates provided by these systems are utilized to corroborate and/or verify the detected location of the brought-in device 108a based on detected visible light/IR. In some embodiments, processor/communication system 112 utilizes the locations provided by external systems (e.g., Bluetooth, UWB, and/or Wi-Fi systems) to monitor changes in location of the brought-in device 108a. In response to a detected change in location, processor/communication system 112 may modify restrictions/permissions associated with a brought-in device and/or may initiate a request for visible light/IR generation to verify a detected change in location.

In some embodiments, processor/communication system 112 generates one or more outputs 222 provided to external systems regarding the detected location of brought-in device 108a (as well as brought-in device 108b shown in FIG. 1) and/or restrictions/permissions assigned to each brought-in device. For example, in some embodiments the detected locations of each brought-in device 108a, 108b are provided to Bluetooth, UWB, and/or Wi-Fi detection systems to verify and/or augment device detection provided by these systems. For example, in some embodiments the detected location of the brought-in devices 108a, 108b as determined based on visible light/IR detection is provided to initialize or calibrate Bluetooth, UWB, and/or Wi-Fi detection systems. That is, using the visible light/IR determined location, Bluetooth, UWB, and/or Wi-Fi signals can be initialized and utilized to detect subsequent changes in location of the brought-in devices 108a, 108b. In some embodiments, the Bluetooth and/or UWB systems can be utilized to provide feedback to processor/communication system 112 regarding changes in detected location of brought-in devices 108a, 108b.

Figure 3:
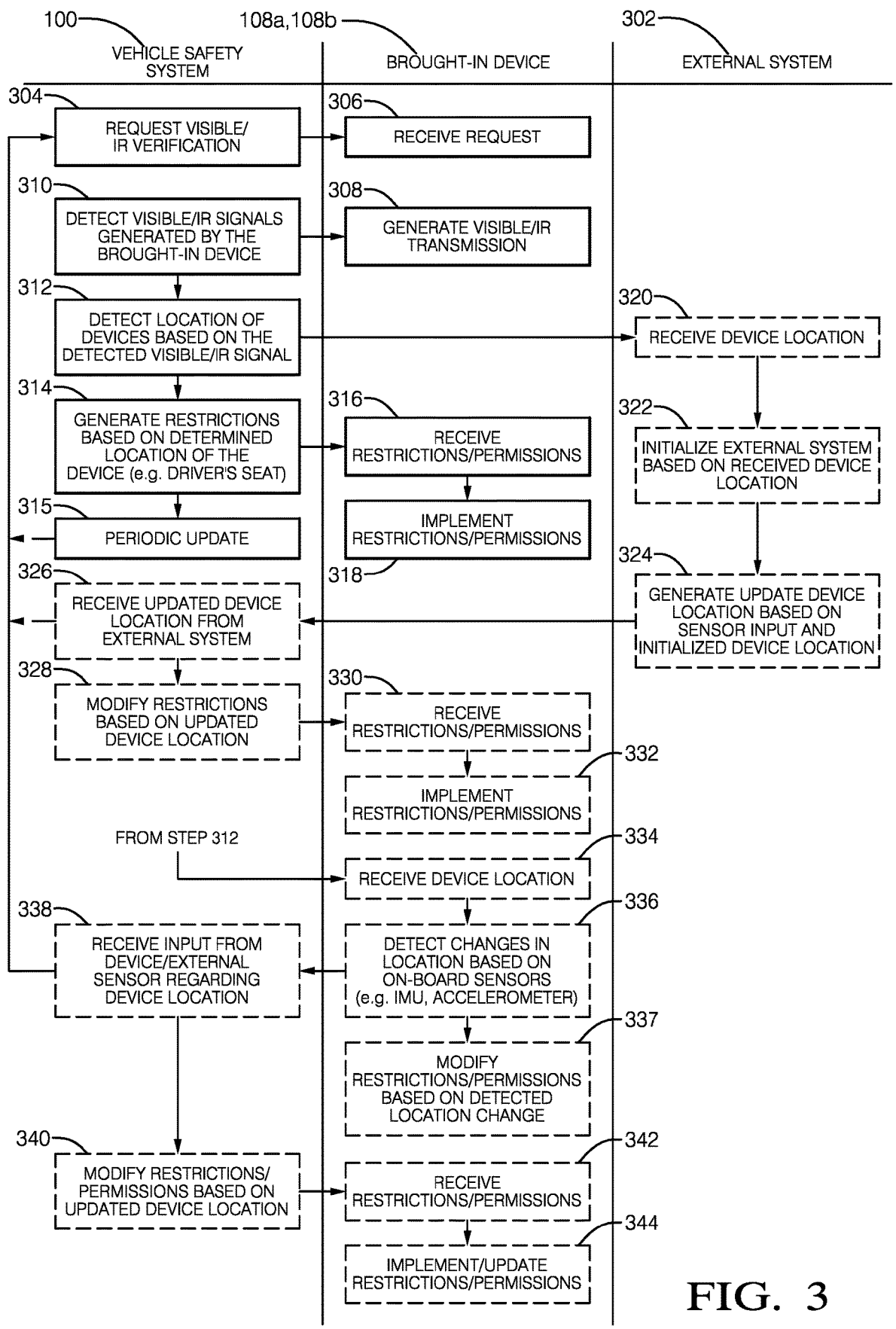
FIG. 3 is a flowchart illustrating steps performed by the vehicle safety system to locate and generate restrictions/permissions according to some embodiments.

FIG. 3 is a swim lane diagram illustrating steps performed by the vehicle safety system 100 and by the brought-in device 108a to locate and generate restrictions/permissions according to some embodiments. Steps performed by the vehicle safety system 100 are shown in the column titled "Vehicle Safety System 100" and steps performed by the brought-in devices 108a and/or 108b are shown in the column titled "Brought-in Device (108a, 108b)".

At step 304, vehicle safety system 100 communicates a request for visible light/IR verification. As discussed above, in some embodiments vehicle safety system 100 communicates the request to each of the plurality of brought-in devices 108a, 108b at approximately the same time. In other embodiments, vehicle safety system 100 communicates the request to individual brought-in devices 108a, 108b one at a time.

At step 306, the brought-in devices 108a, 108b receive the request. In some embodiments, the request may include instructions displayed or otherwise communicated to an owner/user of the brought-in devices 108a, 108b. In some embodiments the request may be communicated to the user via the brought-in device 108a, 108b, or via an external system such as speakers or infotainment displays located in the vehicle. For example, instructions may request the owner/user of the brought-in device 108a to hold it up towards the visible light/IR detector 110a, 110b for verification (i.e., an active request). In other embodiments, the request may be received without requiring notification of the owner/user (i.e., a passive request).

At step 308, brought-in devices 108a, 108b generate a visible/IR signal. As discussed above, in some embodiments the visible/IR signal is encoded with information such as identifying information associated with the brought-in devices 108a, 108b and/or other information utilized to detect and distinguish between the plurality of brought-in devices. For example, the brought-in device 108a may display via the screen of the device a barcode or other unique identifier that allows the one or more detectors to uniquely identify the brought-in device 108a. In other embodiments, the encoding may be based on a series of flashes associated with the LED/flash and/or IR generator. In other embodiments, the visible/IR signal is not encoded with any information.

At step 310, visible/IR signals generated by one or more of the brought-in devices 108a, 108b are detected by the one or more detectors 110a, 110b. Detection of visible/IR signals may include capturing of one or more images associated with the field of view of the detectors 110a, 110b, as well as detection of particular visible light and/or IR signals generated by the brought-in devices 108a, 108b.

At step 312, vehicle safety system 100 utilizes the detected visible/IR signals to determine the location of each of the brought-in devices 108a, 108b. As described above, a number of techniques may be utilized to determine the location of the brought-in devices 108a, 108b based on detected visible/IR signals. For example, in some embodiments the detectors 110a, 110b are positioned to monitor a particular area (e.g., passenger area, driver area, etc.) such that visible/IR signals detected by a particular detector indicates the presence of a brought-in device in the particular area being monitored. In other embodiments, detectors 110a, 110b are utilized to monitor larger fields of view and visible/IR signals generated by a brought-in devices 108a, 108b detected at two or more detectors 110a, 110b are utilized to triangulate a position of the one or more brought-in devices 108a, 108b. In other embodiments, image analysis of one or more images captured by the one or more detectors 110a, 110b is utilized to determine the location of the brought-in devices within the field of view of the respective camera. This may include analysis of visible/IR signals generated by the brought-in devices 108a, 108b (e.g., detection of barcode images displayed by the device on a screen) as well as analysis of objects other than the brought-in device including analysis and detection of user position/location.

At step 314 the vehicle safety system 100 generates restrictions/permissions based on the determined location of the one or more brought-in devices 108a, 108b. In some embodiments, all brought-in devices 108a, 108b default to a restricted mode and require permissions be granted to operate within the vehicle. In other embodiments, brought-in devices are default to a permissive mode, wherein restrictions are generated for those devices detected within the driver area. Depending on the default state of the brought-in devices, at step 314 the permissions/restrictions are generated for devices based on the determined location of each device. The restrictions/permissions generated at step 314 are communicated to the one or more brought-in devices. In some embodiments, the permissions/restrictions are also based on additional information received from the detectors 110a, 110b such as image analysis performed on images captured by the detectors. For example, in some embodiments permissions are generated if the visible light/IR verification determines that the device is located in the passenger area and further confirms via image analysis that a passenger is located in the passenger area and/or that the driver is not extending an aim into the passenger area.

At step 316 the brought-in devices 108a, 108b receive the restrictions/permissions generated by the vehicle safety system 100. At step 318 the brought-in devices 108a, 108b implement the received restrictions/permissions. For example, if functionality of the brought-in devices 108a, 108b are restricted, the brought-in devices may limit operations that can be performed by each device. For example, this may include preventing functions such as unlocking of the brought-in device, messaging via the device, etc. In addition, in some embodiments if the functionality of the brought-in devices is limited via the device itself, at least some of the functionality is transferred to the brought-in device. For example, some of the functions of the brought-in device may be implemented using hands-free functions of the vehicle, such as voice-activated messaging and calling.

In some embodiments, the vehicle safety system 100 operates in conjunction with an additional location system. The dashed lines utilized with respect to steps 320-328 indicate that these steps are optionally performed in some embodiments. For example, in some embodiments the additional or external location system may additionally utilize Bluetooth, UWB and/or Wi-Fi positioning techniques. As described with respect to FIG. 2, vehicle safety system 100 may receive inputs 220 from an external system and may provide outputs 222 to an external system. In the embodiment shown in FIG. 3, vehicle safety system 100 provides device locations to external location system 302. In some embodiments, the device locations—generated utilizing visible light/IR verification—are utilized to initialize the external location system 302.

At step 320, device locations determined by the vehicle safety system 100 based on the detected visible/IR signals generated by the brought-in devices 108a, 108b are received by the external system 302. In some embodiments, the locations of the brought-in devices 108a, 108b are communicated at approximately the same time that the devices are located by the vehicle safety system 100 such that the device location is likely valid. At step 322 the external system 302 is initialized based on the received device location. In some embodiments, this includes recording measurements (e.g., signal strength of Bluetooth, UWB, Wi-Fi signals) associated with each brought-in device 108a, 108b and correlating the measurements with the known location of the brought-in device provided by the vehicle safety system 100. Subsequent changes to the measurements recorded for a particular device can be correlated with changes in location. For example, a weakening signal may be utilized to indicate that a brought-in device 108a, 108b is moving away from a Bluetooth, UWB, and/or Wi-Fi wireless node but does not provide information regarding the location of the device without a starting point. By initializing the locations of the plurality of brought-in devices based on the location determined from the visible/IR signals, the actual locations (not just changes in relative location) of each brought-in device may be determined more accurately.

At step 324, the external system 302 generates updated locations for each brought-in device 108a, 108b based on the measured sensor input and the initialized device location. In addition, external location system 302 communicates the updated locations to the vehicle safety system 100. In some embodiments, every updated location of the brought-in devices 108a, 108b is communicated to vehicle safety system 100. In some embodiments, only changes in location from one area to another (e.g., from the passenger area 106 to the driver area 104) are communicated to the vehicle safety system 100. In some embodiments, only changes in location that result in a change in restrictions/permissions are communicated to the vehicle safety system 100 for review.

At step 326 the updated device locations are received by the vehicle safety system 100. In some embodiments, in response to an updated location of one or more brought-in devices 108a, 108b, the vehicle safety system 100 verifies the location of the brought-in devices 108a, 108b by requesting visible light/IR verification at step 304. In some embodiments, the request for visible light/IR verification is only made in response to an updated device location indicating movement of a device into a restricted area (e.g., driver area 104). In other embodiments, the request for visible light/IR verifications is made in response to an updated device location indicating movement of a device from one area to another (e.g., movement of a brought-in device from the driver area 104 to the passenger area 106, for example if the passenger and driver exchange positions without turning the vehicle OFF). In response to a request for visible light/IR verification, the method proceeds as described above with the determined location of each brought-in device 108a, 108b being utilized to determine restrictions/permissions associated with each device.

In some embodiments, either instead of or in conjunction with the request to initiate visible light/IR verification at step 304, the vehicle safety system 100 may utilize the updated device locations provided by the external system 302 to modify restrictions/permissions associated with the one or more brought-in devices 108a, 108b. In some embodiments, updated device locations received from the external system 302 are only utilized to change permissions from permissive to restrictive (for example, in response to external location system 302 detecting a change in location from a passenger area 106 to a driver area 104). In other embodiments, updated device locations received from the external system 302 are utilized to grant permissions and invoke restrictions based on the updated device location. At step 330, the restrictions/permissions generated by the vehicle safety system 100 are received by the one or more brought-in devices 108a, 108b. At step 332 the brought-in devices 108a, 108b implement the received restrictions or permissions, as described above.

In some embodiments, changes in restrictions/permissions may be initiated based on changes in location detected by the brought-in device 108a, 108b. At step 334, brought-in device 108a, 108b is initialized with a location based on the visible light/IR verification performed at steps 304-314. For example, having determined a location of one or more brought-in devices 108a, 108b at step 312, these locations may be communicated to the brought-in devices 108a, 108b. As discussed above, initializing brought-in device 108a, 108b with a location allows brought-in device to detect changes in location that result in the brought-in device moving from a restricted area to a non-restricted area, and vice versa. In other embodiments, however, brought-in device 108a, 108b does not need to be aware of its own location, but rather only needs to be capable of detecting changes in its own location.

At step 336, secondary sensors (e.g., sensors 208 shown in FIG. 2) associated with brought-in device 108a, 108b are utilized to detect changes in location. For example, secondary sensors may include one or more of accelerometers, inertial measurements units (IMU), etc. For example, a brought-in device 108a, 108b determined by the vehicle safety system 100 to be located in the passenger area adjacent to driver area 104 may detect lateral movement based on the one or more on-board sensors, indicating movement of the brought-in device 108a, 108b from the passenger area 106 to the driver area 104. In embodiments in which brought-in device 108a, 108b is not aware of its current location, then the detection of movement is communicated to the vehicle safety system 100 for review. In some embodiments, at step 337, brought-in device 108a, 108b automatically modifies restrictions and/or permissions based on detected changes in location. For example, in some embodiments a detected change in location from a non-restricted area (e.g., passenger area 106) to a restricted area (driver area 104) results in automatic generation of restrictions associated with the brought-in device 108a, 108b. In some embodiments, a detected change in location from a restricted area to a non-restricted area may also result in automatic execution of permissions associated with the brought-in device 108a, 108b. However, in some embodiments it may be desirable to automatically initiate restrictions in response to a detected change in location from a non-restricted area to a restricted one, but to require verification prior to initiating permissions in response to a device moving from a non-restricted area to a restricted one.

In some embodiments, at step 338 the vehicle safety system 100 receives input from the brought-in device 108a, 108b regarding the change in location detected by the brought-in device 108a, 108b. In some embodiments, at step 340 the vehicle safety system 100 modifies the restrictions/permissions based on the detected change in location received from the brought-in device 108a, 108b. The modified restrictions/permissions are received by the brought-in device 108a, 108b at step 342 and implemented by the brought-in device 108a, 108b at step 344. In other embodiments, in response to the detected change in location, the vehicle safety system 100 verifies the location of the brought-in device 108a, 108b by initiating a visible light/IR verification at step 304, in which restrictions/permissions are determined based on the outcome of the visible light/IR verification. In some embodiments, the decision determining whether to initiate a visible light/IR request at step 304 or rely on the detected change in location provided by the brought-in device 108a, 108b is based on the resulting change in permission. In general, a change from a more permissive state to a more restrictive state may be initiated more readily to prevent devices from operating in the driver area. Conversely, a change in state from a restrictive state to a permissive state may require verification to ensure permissions are not granted to a device operating in the driver area.

Discussion of Possible Embodiments

The following are non-exclusive descriptions of possible embodiments of the present invention.

According to one aspect, a vehicle safety system for restricting the functionality of brought-in devices within a vehicle includes at least one detector positioned to monitor at least a portion of an interior of a vehicle and a processor/communication system configured to receive inputs from the at least one detector and to communicate with brought-in devices located within the vehicle. The processor/communication system determines a location of the brought-in device based on visible/IR signals generated by the brought-in device and detected by the at least one detector, wherein the processor/communication system communicates restrictions/permissions to the brought-in device based on the determined location.

The vehicle safety system of the preceding paragraph can optionally include, additionally and/or alternatively any, one or more of the following features, configurations and/or additional components.

For example, the processor/communication system may communicate bi-directionally with brought-in devices.

In some embodiments, the processor/communication system communicates requests to the brought-in devices, wherein the brought-in devices generate visible/IR signals in response to the received requests.

In some embodiments, the processor/communication system communicates requests one at a time to brought-in devices located within the vehicle.

In some embodiments, visible/IR signals detected by the at least one detector are encoded with identifying information unique to the brought-in device originating the visible/IR signal.

In some embodiments, the processor/communication system identifies devices located within the vehicle based on the encoded visible/IR signals received by the at least one detector.

In some embodiments, the processor/communication system determines the location of the device based, at least in part, on additional inputs received from one or more sensors located within the vehicle.

In some embodiments, the one or more sensors include a seat occupancy sensor configured to provide an occupancy input with respect to each seat within the vehicle.

In some embodiments, the processor/communication system provides full privileges to a brought-in device determined to be located in a passenger seat based on detected visible/IR signals in combination with the occupancy input indicating the presence of an occupant in the passenger seat.

In some embodiments, the processor/communication system receives feedback from the brought-in devices indicating a detected change in location of the brought-in device, wherein the processor/communication system modifies permissions/restrictions based on the received feedback.

In some embodiments, the processor/communication system communicates the location of the brought-in device determined based on the detected visible/IR signal to the brought-in device, wherein the brought-in device utilizes the received location to monitor changes in location within the vehicle.

In some embodiments, the processor/communication system communicates the location of the brought-in device determined based on the detected visible/IR signal to one or more external systems utilized to monitor locations of the brought-in devices.

In some embodiments, the at least one detector captures one or more images, wherein the processor/communication system is configured to determine the location of the brought-in device based on image analysis of the one or more captured images.

In some embodiments, the processor/communication system utilizes image analysis to identify barcodes displayed by the brought-in device to uniquely identify and determine the location of the brought-in device.

In some embodiments, the processor/communication system utilizes image analysis to detect a position of occupants within the vehicle, wherein the detected position of occupants is utilized in combination with the detected location of brought-in devices to determine restrictions/permissions assigned to each brought-in device.

According to another aspect, a method of restricting device privileges within a vehicle, the method includes requesting visible/infrared (IR) verification from one or more brought-in devices. The method further includes detecting visible/IR signals generated by the one or more brought-in devices and determining a location of each of the one or more brought-in devices based on the detected visible/IR signals. Restrictions/permission are generated based on the determined location of each of the one or more brought-in devices and are communicated to the one or more brought-in devices.

The method of the preceding paragraph can optionally include, additionally and/or alternatively any, one or more of the following features, configurations and/or additional components.

For example, the method may further include identifying each of the plurality of brought-in devices located within the vehicle.

In some embodiments, requesting visible/IR verification from one or more brought-in devices includes requesting visible/IR verification from one device at a time, wherein detected visible/IR signals are correlated with the brought-in device to which the request was sent.

In some embodiments, generating restrictions/permissions includes generating restrictions for brought-in devices determined to be located in a driver seating area.

In some embodiments, the method further includes receiving feedback from the one or more brought-in devices regarding a change in location detected by the brought-in device and utilizing the received feedback to modify restrictions/permissions associated with the one or more brought-in devices.

In some embodiments, requesting visible/IR verification from one or more devices is performed periodically to monitor changes in location of the one or more devices.

In some embodiments, the method further includes communicating the location of the brought-in device determined based on the detected visible/IR signal to one or more external systems utilized to monitor locations of the brought-in devices.

In some embodiments, the method further includes receiving feedback from the one or more external systems regarding changes in location of the one or more brought-in devices.

In some embodiments, the one or more external systems utilize one or more of Bluetooth, Ultrawide band (UWB), or Wi-Fi communication signals to monitor a location of the brought-in device.

In some embodiments, detecting visible/IR signals generated by the one or more brought-in devices includes capturing one or more images.

In some embodiments, determining a location of each of the one or more brought-in devices based on the detected visible/IR signals includes analyzing the one or more captured images to detect a location of the one or more brought-in devices.

In some embodiments, analyzing the one or more captured images to detect the location of the one or more brought-in devices includes identifying a barcode displayed by the brought-in device that uniquely identifies the brought-in device.

In some embodiments, analyzing the one or more captured images further includes analyzing the one or more captured images to detect a location of an occupant relative to the detected brought-in device, wherein generating permissions/restrictions are based on the detected location of the brought-in devices and the detected location of the occupant relative to the brought-in device.

The invention claimed is:

1. A vehicle safety system for restricting the functionality of brought-in devices within a vehicle, the system comprising:
   at least one visible light/infrared (IR) camera positioned to monitor at least a portion of an interior of a vehicle;
   an processor/communication system configured to receive inputs from the at least one camera and to communicate with brought-in devices located within the vehicle, wherein the processor/communication system determines a location of the brought-in device within the vehicle based on visible/IR signals displayed by the brought-in device and detected by the at least one camera, wherein the processor/communication system communicates restrictions/permissions to the brought-in device based on the determined location within the vehicle.

2. The vehicle safety system of claim 1, wherein the processor/communication system communicates requests to the brought-in devices, wherein the brought-in devices generate visible/IR signals in response.

3. The vehicle safety system of claim 2, wherein the processor/communication system communicates requests one at a time to brought-in devices located within the vehicle.

4. The vehicle safety system of claim 1, wherein visible/IR signals detected by the at least one camera is encoded with identifying information unique to the brought-in device originating the visible/IR signal.

5. The vehicle safety system of claim 4, wherein the processor/communication system identifies devices located within the vehicle based on the encoded visible/IR signals received by the at least one camera.

6. The vehicle safety system of claim 1, wherein the processor/communication system determines the location of the device based, at least in part, on additional inputs received from one or more sensors located within the vehicle.

7. The vehicle safety system of claim 1, wherein the processor/communication system receives feedback from the brought-in devices indicating a detected change in location of the brought-in device, wherein the processor/communication system modifies permissions/restrictions based on the received feedback.

8. The vehicle safety system of claim 7, wherein the processor/communication system communicates the location of the brought-in device determined based on the detected visible/IR signal to the brought-in device, wherein the brought-in device utilizes the received location to monitor changes in location within the vehicle.

9. The vehicle safety system of claim 1, wherein processor/communication system communicates the location of the brought-in device determined based on the detected visible/IR signal to one or more external systems utilized to monitor locations of the brought-in devices.

10. The vehicle safety system of claim 1, wherein the at least one camera captures one or more images, wherein the processor/communication system is configured to determine the location of the brought-in device based on image analysis of the one or more captured images.

11. The vehicle safety system of claim 10, wherein the processor/communication system utilizes image analysis to identify barcodes displayed by the brought-in device to uniquely identify and determine the location of the brought-in device.

12. The vehicle safety system of claim 10, wherein the processor/communication system utilizes image analysis to detect a position of occupants within the vehicle, wherein the detected position of occupants is utilized in combination with the detected location of brought-in devices to determine restrictions/permissions assigned to each brought-in device.

13. A method of restricting device privileges within a vehicle, the method comprising:
   requesting visible/infrared (IR) verification from one or more brought-in devices;
   detecting visible/IR signals displayed by the one or more brought-in devices;
   determining a location of each of the one or more brought-in devices within the vehicle based on the detected visible/IR signals;
   generating restrictions/permission based on the determined location of each of the one or more brought-in devices within the vehicle; and
   communicating the restrictions/permissions to the one or more brought-in devices.

14. The method of claim 13, further including identifying each of the plurality of brought-in devices located within the vehicle.

15. The method of claim 14, wherein requesting visible/IR verification from one or more brought-in devices includes requesting visible/IR verification from one device at a time, wherein detected visible/IR signals are correlated with the brought-in device to which the request was sent.

16. The method of claim 13, wherein generating restrictions/permissions includes generating restrictions for brought-in devices determined to be located in a driver seating area.

17. The method of claim 13, further including receiving feedback from the one or more brought-in devices regarding a change in location detected by the brought-in device and utilizing the received feedback to modify restrictions/permissions associated with the one or more brought-in devices.

18. The method of claim 13, further including communicating the location of the brought-in device determined based on the detected visible/IR signal to one or more external systems utilized to monitor locations of the brought-in devices.

19. The method of claim 18, further including receiving feedback from the one or more external systems regarding changes in location of the one or more brought-in devices.

20. The method of claim 13, wherein detecting visible/IR signals displayed by the one or more brought-in devices includes capturing one or more images.

21. The method of claim 20, wherein determining a location of each of the one or more brought-in devices based on the detected visible/IR signals, includes analyzing the one or more captured images to detect a location of the one or more brought-in devices.

22. The method of claim 21, wherein analyzing the one or more captured images to detect the location of the one or more brought-in devices includes identifying a barcode displayed by the brought-in device that uniquely identifies the brought-in device.

23. The method of claim 21, wherein analyzing the one or more captured images further includes analyzing the one or more captured images to detect a location of an occupant relative to the detected brought-in device, wherein generating permissions/restrictions are based on the detected location of the brought-in devices and the detected location of the occupant relative to the brought-in device.

* * * * *